(12) United States Patent
Matsuura

(10) Patent No.: US 7,162,804 B2
(45) Date of Patent: Jan. 16, 2007

(54) SAFETY DEVICE FOR A TRIMMER

(75) Inventor: Takuji Matsuura, Okayama (JP)

(73) Assignee: Andreas Stihl AG & Co. KG, Waiblingen (DE)

( * ) Notice: Subject to any disclaimer, the term of this patent is extended or adjusted under 35 U.S.C. 154(b) by 259 days.

(21) Appl. No.: 10/708,557

(22) Filed: Mar. 11, 2004

(65) Prior Publication Data

US 2004/0237317 A1   Dec. 2, 2004

(30) Foreign Application Priority Data

Mar. 11, 2003   (JP) ............................. 2003-064987

(51) Int. Cl.
   *B26B 19/02*   (2006.01)
(52) U.S. Cl. .......................................... 30/210; 30/199
(58) Field of Classification Search ................. 30/276, 30/210, 228, 199; 83/DIG. 1, 62.1; D8/8; 56/12.7
   See application file for complete search history.

(56) References Cited

U.S. PATENT DOCUMENTS

| 1,969,035 A | 8/1934 | Rice et al. ..................... 255/23 |
| 4,026,392 A * | 5/1977 | Hirschkoff .................. 188/166 |
| 4,464,948 A | 8/1984 | Lindemeyer ................ 74/411.5 |
| 4,651,420 A * | 3/1987 | Lonnecker .................. 30/296.1 |
| 6,182,367 B1* | 2/2001 | Janczak ....................... 30/392 |
| 6,735,873 B1* | 5/2004 | Langhans et al. ............. 30/216 |
| 2002/0194739 A1 | 12/2002 | Krane et al. ............... 30/296.1 |
| 2004/0035009 A1* | 2/2004 | Richards ..................... 30/381 |

FOREIGN PATENT DOCUMENTS

| DE | 4101705 | 3/1992 |
| EP | 0 834 248 | 4/1998 |
| EP | 0 879 553 | 11/1998 |

OTHER PUBLICATIONS

Merriam Webster Online. http://www.m-w.com/cgi-bin/dictionary?book=Dictionary&va=blade. Viewed Mar. 17, 2006. See 3(a).*

* cited by examiner

*Primary Examiner*—Kenneth E. Peterson
*Assistant Examiner*—Sean M. Michalski
(74) *Attorney, Agent, or Firm*—Gudrun E. Huckett

(57) ABSTRACT

A hedge trimmer has a working part with a cutting tool and a drive and further has guide part with a guide rod that has a drive connection for connecting a drive motor to the drive of the working part. The working part is pivotable relative to the guide part. A safety device in the form of a drive cutoff mechanism is provided that switches off the drive of the working part when the angle between the working part and the guide part is within a predetermined pivot angle range.

12 Claims, 6 Drawing Sheets

SAFETY DEVICE FOR A TRIMMER

BACKGROUND OF INVENTION

1. Field of the Invention

The invention relates to a safety device for a trimmer, in particular, a trimmer such as a hedge trimmer, grass trimmer or the like. The trimmer has a working part, comprising a cutting tool and a drive, and further has a guide part with a guide rod that has a drive connection for connecting a drive motor to the drive of the working part. The working part is pivotable relative to the guide part.

2. Description of the Related Art

In known trimmers, the working part has a reciprocating blade or a rotary blade. The working part is held by hand by means of a guide shaft wherein the guide shaft houses a drive connection in order to transmit the power of a drive motor onto the working part. In such a trimmer, it is expedient to angularly position the working part relative to the guide shaft for positional adaptation of the cutting tool to the topography of the area to be worked on provided with vegetation to be trimmed, for example, grass, lawn, or hedges.

For this purpose, the operating guide shaft and the working part are pivotably connected to one another so that the working part can be rotated relative to the guide shaft about a freely selectable angle. The pivoting mechanism is designed such that the working part can be pivoted also about an angle at which angle the working part is facing the operator.

SUMMARY OF INVENTION

It is an object of the present invention to design a trimmer of the aforementioned kind such that an endangerment of the operator by the cutting tool of the pivotable working part is reduced.

This object is solved in that a safety device in the form of a drive cutoff mechanism is provided that switches off the drive of the working part when the angle between the working part and guide part is within a predetermined pivot angle range.

By providing that the cutting tool arranged on the working part is switched off for safety reasons by means of the drive cutoff mechanism every time when the working part is positioned at a predetermined angle relative to the operator, an endangerment of the operator can be prevented.

According to a further embodiment of the invention, the drive cutoff mechanism that switches off the drive of the working part is arranged above the working part and the guide part so that collision with the ground is prevented even when the working part is in a greatly angled position.

Preferably, the drive cutoff mechanism has an engagement member that engages a drive member of the drive in order to stop the cutting tool. For this purpose, the engagement member engages expediently between the teeth of a gear wheel of the drive. Advantageously, this is realized by means of a cam-actuated lifting pin that, in particular, rotates the engagement member into the engagement position.

DETAILED DESCRIPTION

Figure 4:
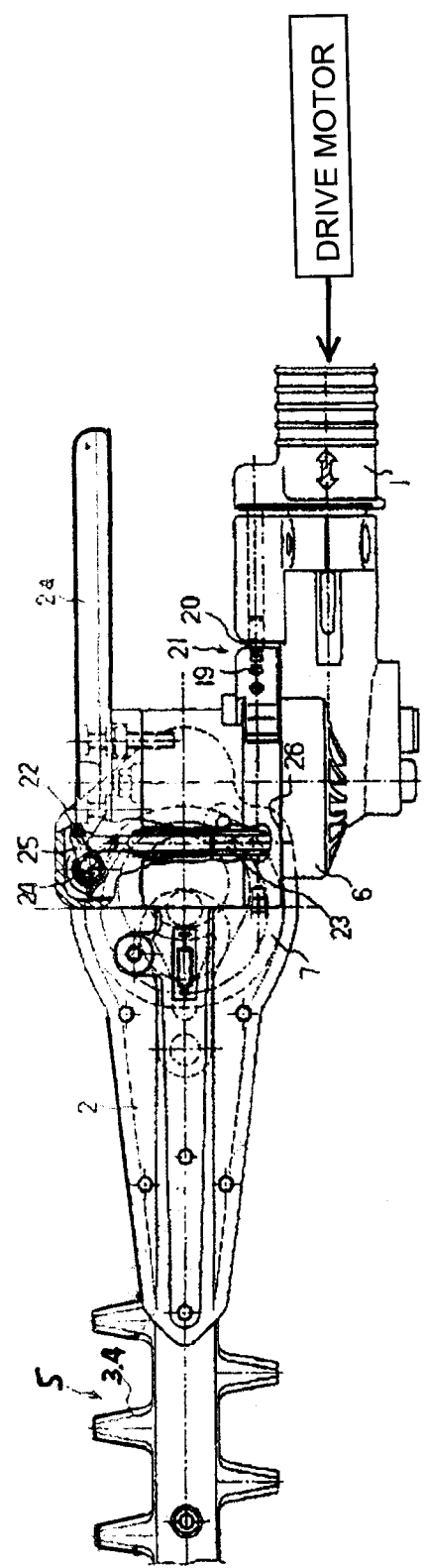
FIG. 4 is a plan view onto a trimmer according to FIG. 3, shown partially in section.
Figure 5:
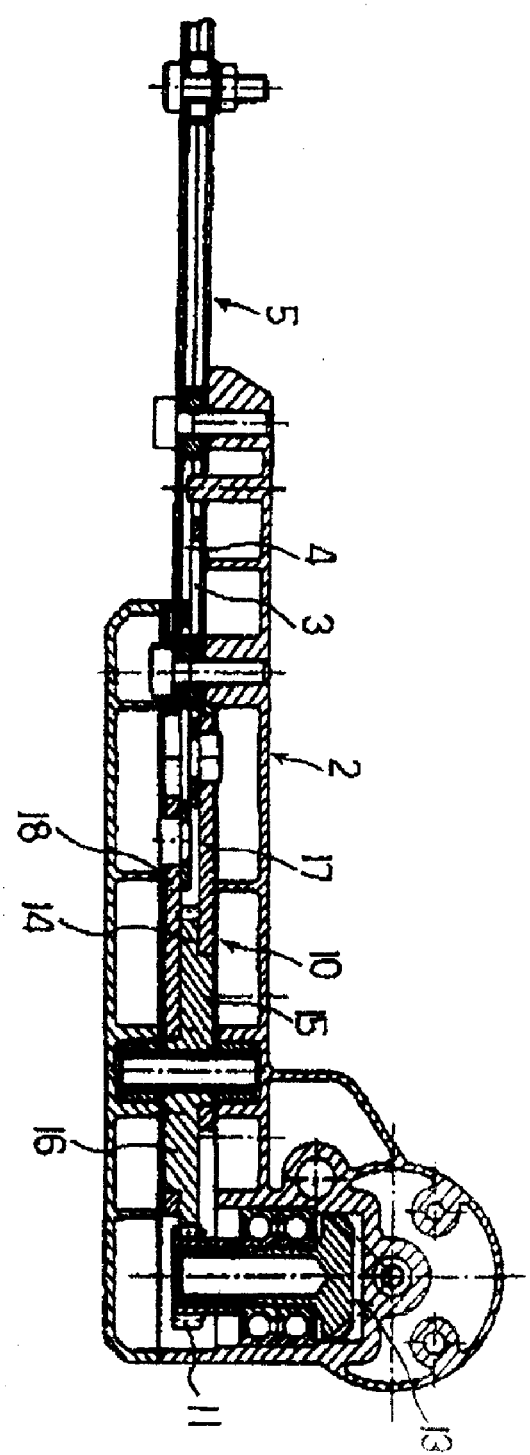
FIG. 5 shows a partial longitudinal section of the trimmer according to FIG. 3.
Figure 6:
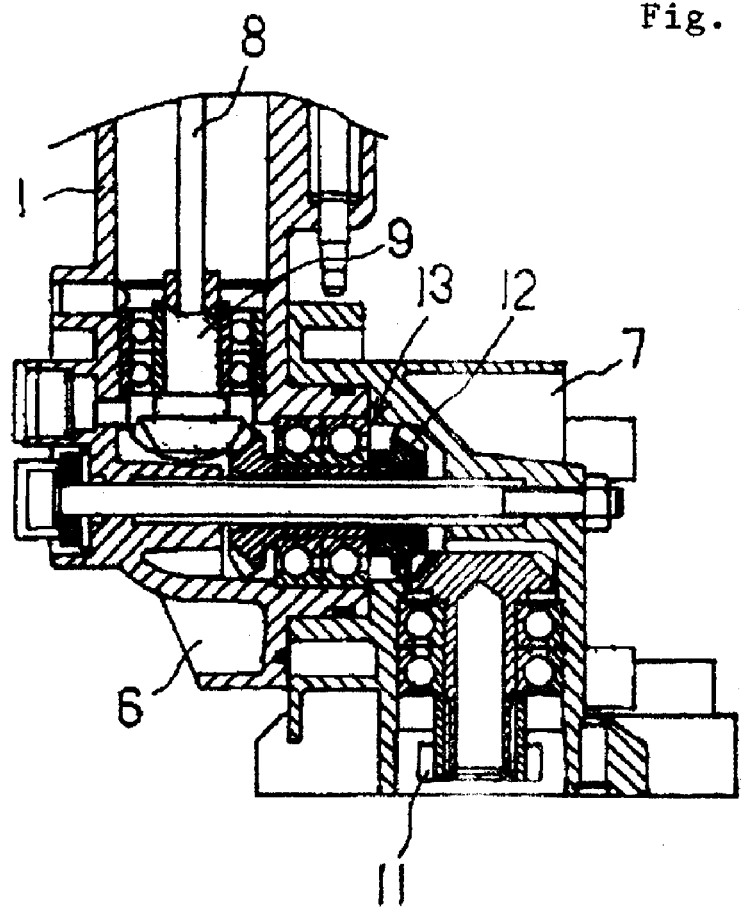
FIG. 6 is an enlarged illustration in section of a gear connection between the working part and the guide part.

The embodiment of the invention illustrated in FIG. 4 shows a plan view of a trimmer shown partially in section; the trimmer is embodied as a hedge trimmer and is provided with a cutting tool 5 in the form of a reciprocating blade. FIGS. 5 and 6 show this trimmer in section views.

The trimmer comprises a guide shaft 1 that is gripped by the hands of an operator for holding and guiding the trimmer. The lower end of the guide shaft 1 is provided with a guide part 1a that is pivotably connected to the working part 2. Accordingly, the working part 2 is pivotable relative to the guide shaft 1 at the lower end of the guide shaft 1. In the illustrated embodiment, the working part 2 has a cutting tool 5 in the form of a reciprocating blade that is comprised of an upper blade 4 and a lower blade 4. At the other end of the guide shaft 1, a drive motor is arranged (illustrated only schematically in FIG. 4). The motor can also be a separate unit that is carried on the back of the operator.

At the lower end of the guide shaft 1, a cup-shaped coupling member 6 is arranged that cooperates with a further cup-shaped coupling member 7 at one end of the working part 2. The coupling members 6 and 7 engage one another and, in this connection, advantageously rests against one another with their end faces and are connected to one another. The coupling member 6 connected to the guide shaft 1 is provided with a gearbox connector 9 that is driven by the drive shaft 8 of the motor. The coupling member 7 connected to the working part 2 is provided with a gearbox output 11 that transmits power onto the drive 10 arranged in the working part 2 for driving the reciprocating blade 5. A bevel gear arrangement 12 arranged between the two coupling members 6 and 7 transmits power from the gearbox connector 9 to the gearbox output 11; these components provide a gear transmission 13.

The cutting tool drive 10 is comprised of a gear wheel 14, which is to be driven by the gearbox output 11 of the gear transmission 13, and eccentric cams 15 and 16 that are symmetrically arranged on the topside and bottom side of the gear wheel 14. These eccentric cams 15 and 16 drive by means of connecting rods 17 and 18 the upper blade 3 and the lower blade 4, respectively. For this purpose, the blades 3 and 4 are connected to the leading end of the connecting rods 17 and 18, respectively. The power output of the motor is transmitted by the gear transmission 13 onto the drive 10, wherein the upper blade 3 and lower blade 4 are reciprocated in opposite directions in order to trim grass and brush.

In the disclosed configuration, the guide shaft 1 and the working part 2 can be pivoted relative to one another wherein the end faces of the coupling members 6 and 7 resting against one another are used as gliding surfaces. Even when the device is operating, pivoting can be realized by rotation of the lever 2a that is mounted on the working part 2. In this connection, the guide shaft 1 is rotated in a plane that extends perpendicularly to the cutting plane of the reciprocating blade 5 arranged in the working part 2. In this way, the trimmer can be adjusted such that in operation an optimal angle of the cutting tool relative to the ground surface of an area with vegetation to be trimmed is provided. The trimmer is to be locked within a pre-determined safety angle range for which purpose a locking mechanism 21 is provided. It is comprised of recesses 19 that are formed spaced apart from one another at one of the coupling members 6 or 7 and a locking pin 20 that is provided on the other coupling member 7 or 6 and can engage and be retracted from one of these recesses 19, respectively. The locking pin 20 is expediently fastened on a sliding sleeve that is movable on the guide shaft 1 against the force of a spring, not illustrated, in order to release the locking pin 20 from a recess 19 and cancel the locking action.

Figure 1:
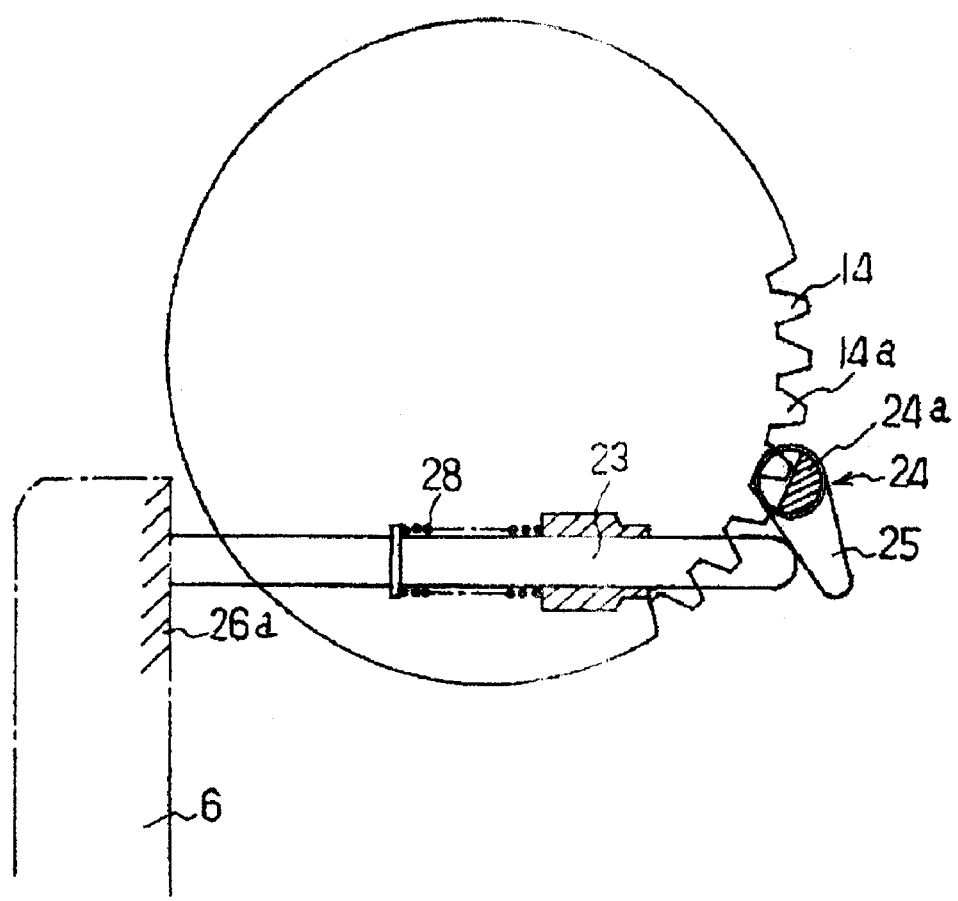
FIG. 1 shows a schematic plan view onto one embodiment of a safety device according to the invention in the disengaged position.
Figure 2:
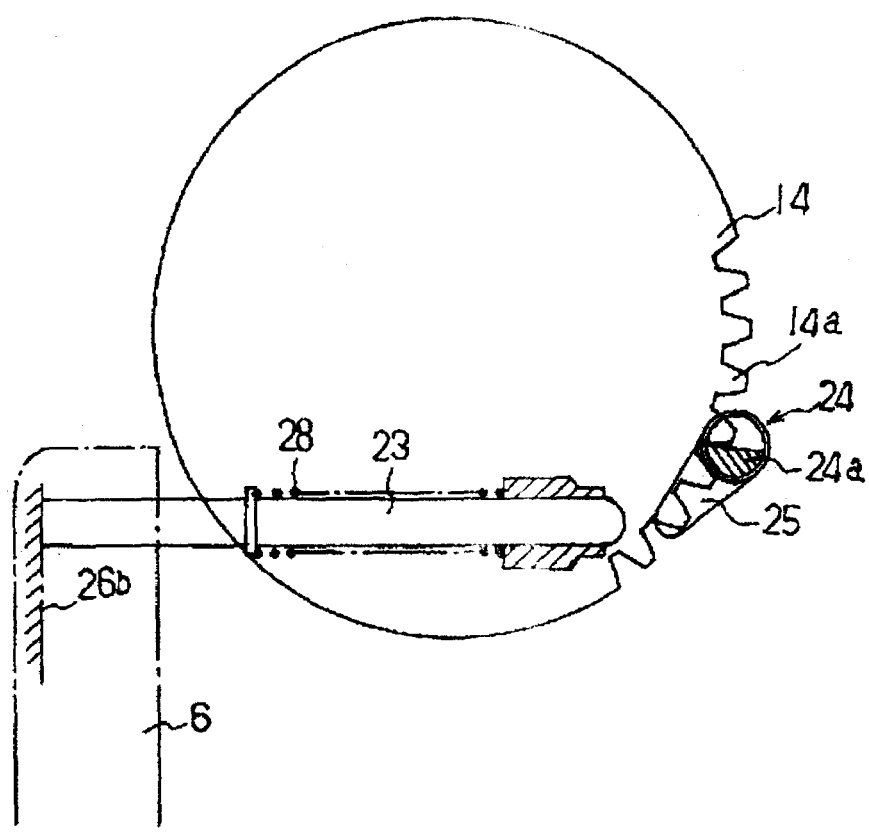
FIG. 2 shows a schematic plan view onto the safety device according to FIG. 1 in the engaged position.
Figure 3:
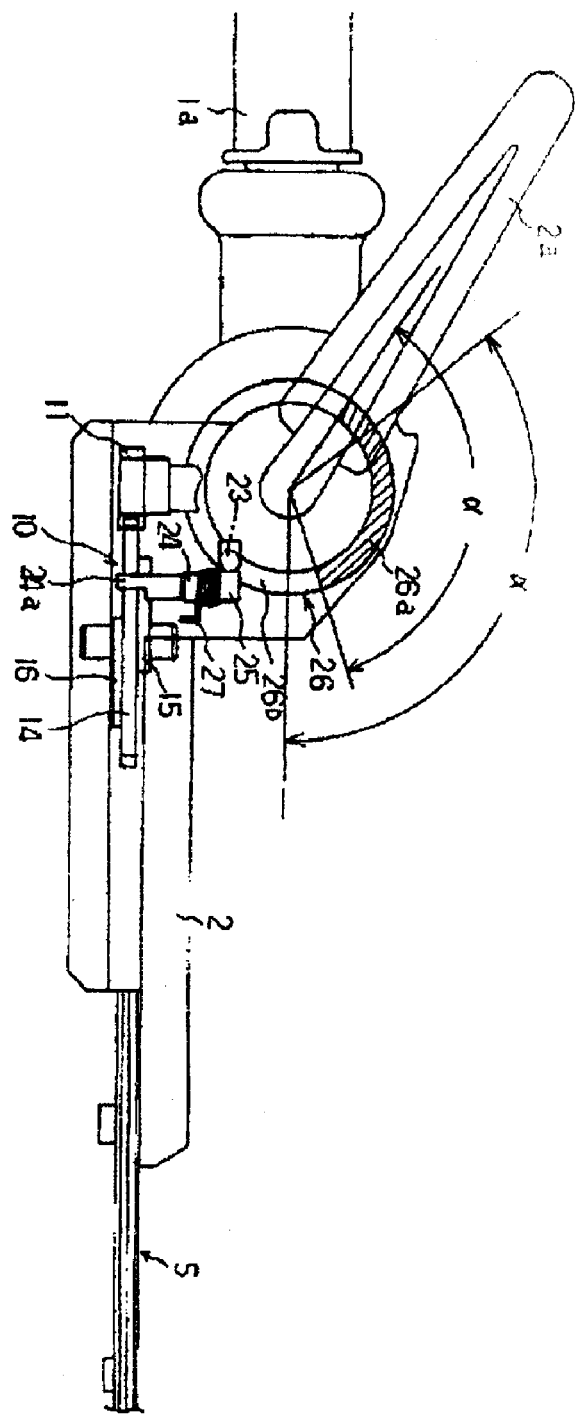
FIG. 3 is a side view of a trimmer with a safety device according to the invention.

According to the invention, a drive cutoff mechanism 22 is provided that switches off the drive 10 of the working part 2 when the angle α (between the guide shaft 1 and the working part 2 reaches a dangerous angle range. FIG. 1 and FIG. 2 are schematic plan views onto the main part; FIG. 3 is a side view onto an embodiment of such drive cutoff mechanism 22. In the illustrated embodiment, the drive cutoff mechanism 22 comprises a lifting pin 23 that is slidably secured above the coupling member 6 of the guide shaft 1 and the coupling member 7 of the working part 2 and can move back and forth. An engagement member 24 is controlled by the lifting pin 23 in order to engage or release the drive 10, i.e., advantageously a gear wheel 14 of the drive 10.

In the illustrated embodiment, the engagement member 24 is pin-shaped and extends parallel to the shaft of the gear wheel 14. The engagement member 24 is configured at its lower end with an engagement section 24 whose shape or cross-section is cut in half in order to be able to engage between the teeth 14a of the gear wheel 14. At the upper end of the engagement member 24, a lever 25 is arranged. The lifting pin 23 moves toward or away from this lever 25; the rear end of the lifting pin 23 contacts a cam control surface 26 that is formed on the coupling member 6 of the guide shaft 1.

The cam control surface 26 is configured such that, relative to the lifting pin 23, it has a raised lifting position or a lowered lifting position. The cam control surface 26 is configured such that a cam control surface 26a that is raised relative to the lifting pin 23 is effective when the angular position of the guide shaft 1 is within a permissible safety angle range relative to the working part 2. By means of the raised cam control surface 26a, the lifting pin 23 is pushed forwardly and acts on the lever 25 of the engagement member 24 so that the engagement member 24 is being rotated. Accordingly, the engagement section 24a moves out of the teeth 14a of the gear wheel 14 (FIG. 1); the drive 10 of the working part 2 is free and unlocked so that the reciprocating blade 5 can operate.

When the guide shaft 1 is pivoted out of the safety angle range into a dangerous angle range relative to the working part 2, a recessed cam control surface 26b of the cam control surface 26 becomes effective. This control surface 26b is adjusted such that the lifting pin 23 is retracted axially away from the lever 25 and is lifted off the lever 25. Accordingly, the engagement member 24 rotates back in the original direction so that the engagement section 24a is moved between the teeth 14a of the gear wheel 14 (FIG. 2). The gear wheel 14 is therefore blocked and switches off the drive 10 of the drive part 2. The reciprocating blade 5 is stopped.

In order to configure the locking mechanism so as to be functionally reliable, the engagement member 24 is pushed by a torsion spring 27 in the direction toward the locking position and, advantageously, the lifting pin 23 is spring loaded axially by a spring 28 in a direction in which it lifts off the lever 25.

For locking the drive 10, the movement kinematics is selected such that the rotary driving movement of the gear wheel 14 about its axis and the rotational direction of the engagement member 24 about its axis are opposite to one another. Therefore, when the engagement section 24a engages the teeth 14a of the gear wheel 14, the rotational force of the gear wheel 14 acts in the direction of rotation of the engagement section 24a into the position between the teeth 14a. The engagement section 24a is thus automatically engaged by the teeth 14a so that a safe locking action is obtained.

In the embodiment, the reliable safety angle range and the impermissible angle range of the guide shaft 1 relative to the working part 2 can be adjusted precisely. For example, an angle range starting at an angle at which the guide shaft 1 is overlapped by the working part 2 (for example, when the trimmer is turned off) up to an angle that is greater than a right angle and at which the guide shaft 1 is positioned slightly inclined, for example, approximately 120°, can be classified as a dangerous angle range (α). Angles outside of this angle range can be classified as being within the safety angle range, and the cam control surfaces 26a, 26b can be correspondingly adjusted with regard to their rotational position and extensions. The angle ranges and the classifications of the angles are not limited to those mentioned here. The cam control surface 26 is adjusted according to the desired angle (α) to be elevated or lowered.

In the embodiment, the cutting tool 5 is illustrated and described as a reciprocating blade. The present invention can also be employed when the cutting blade is a rotary blade and the working part 2 and the guide shaft 1 are pivotable relative to one another. In the case of a cutting tool 5 in the form of rotary blade, the described drive cutoff mechanism 22 can be used as long as a drive for transmitting the power of the motor onto the rotary blade is provided.

According to the invention, the drive cutoff mechanism 22 that turns off the drive 10 of the working part 2 for driving the cutting blade of the working part 2 is arranged above the working part 2 and the guide part 1a with the guide shaft 1. When the working part 2 and the guide shaft 1 are pivoted into an impermissible angle range, for example, when the working part 2 is overlapped by the guide shaft 1, the drive cutoff mechanism 22 stops the drive 10 so that the cutting blade arranged within the working part 2 is no longer driven so that a high safety level is provided in this way.

While specific embodiments of the invention have been shown and described in detail to illustrate the inventive principles, it will be understood that the invention may be embodied otherwise without departing from such principles.

What is claimed is:

1. A trimmer having a safety device said trimmer has a working part, comprising a cutting tool and a drive, a guide part comprising a guide shaft, and a drive motor arranged on a first end of the guide shaft, wherein a second end of the guide shaft is provided with a drive connection to the working part for drivingly connecting the drive motor to the drive of the working part, wherein the working part is pivotable relative to the guide part to angularly position the working part relative to the guide shaft for positional adaptation of the working part to an area to be worked on; the safety device having:

a drive cutoff mechanism that switches off the drive of the working part when an angle between the working part and the guide part is moved to within a predetermined pivot angle range.

2. The trimmer according to claim 1, wherein the drive cutoff mechanism is arranged above the working part and the guide part.

3. The trimmer safety device according to claim 1, wherein the drive cutoff mechanism comprises an engagement member, wherein the engagement member engages a drive member of the drive in order to turn off the drive.

4. The trimmer according to claim 3, wherein the engagement member has an engagement section, wherein the engagement section of the engagement member is pushed between teeth of a gear wheel forming the drive member of the drive.

5. The trimmer according to claim 3, wherein the drive cutoff mechanism further comprises a cam-controlled lifting pin, wherein the engagement member is actuated by the cam-controlled lifting pin.

6. The trimmer according to claim 5, wherein the engagement member is rotated by the lifting pin.

7. The trimmer according to claim 6, wherein a rotary driving direction of the drive member of the drive and a rotational direction of the engagement section of the engagement member for engaging the drive member are oriented opposite to one another.

8. The trimmer according to claim 1, wherein the cutting tool is a blade.

9. The trimmer according to claim 8, wherein the blade is a reciprocating blade.

10. The trimmer according to claim 8, wherein the blade is a rotary blade.

11. The trimmer according to claim 1, wherein the trimmer is a hedge trimmer or a grass trimmer.

12. A trimmer having a safety device said trimmer has a working part, comprising a cutting tool and a drive, and a guide part comprising a guide shaft that has a drive connection for connecting a drive motor to the drive of the working part, wherein the working part is pivotable relative to the guide part; the safety device having:

a drive cutoff mechanism that switches off the drive of the working part when an angle between the working part and the guide part is moved to within a predetermined pivot angle range;

wherein the drive cutoff mechanism comprises an engagement member, wherein the engagement member engages a drive member of the drive in order to turn off the drive; and wherein the engagement member has an engagement section, wherein the engagement section of the engagement member is pushed between teeth of a gear wheel forming the drive member of the drive.

* * * * *